No. 647,505. Patented Apr. 17, 1900.
H. P. MAXIM & H. M. POPE.
VEHICLE FRAME.
(Application filed July 26, 1898.)
(No Model.) 4 Sheets—Sheet 1.

Attest:
A. N. Jesbera
E. M. Taylor

Inventors:
Harry M. Pope and
Hiram Percy Maxim
by Redding, Kiddle & Greeley
Attys.

No. 647,505. Patented Apr. 17, 1900.
H. P. MAXIM & H. M. POPE.
VEHICLE FRAME.
(Application filed July 26, 1898.)
(No Model.) 4 Sheets—Sheet 4.

Attest:
A. N. Jesbera.
E. M. Taylor.

Inventors:
Harry M. Pope
Hiram Percy Maxim
by Redding, Kiddle & Greeley
Attys.

UNITED STATES PATENT OFFICE.

HIRAM PERCY MAXIM AND HARRY M. POPE, OF HARTFORD, CONNECTICUT, ASSIGNORS, BY MESNE ASSIGNMENTS, TO THE COLUMBIA AND ELECTRIC VEHICLE COMPANY, OF JERSEY CITY, NEW JERSEY.

VEHICLE-FRAME.

SPECIFICATION forming part of Letters Patent No. 647,505, dated April 17, 1900.

Application filed July 26, 1898. Serial No. 686,919. (No model.)

*To all whom it may concern:*

Be it known that we, HIRAM PERCY MAXIM and HARRY M. POPE, citizens of the United States, residing in the city and county of Hartford, State of Connecticut, have invented certain new and useful Improvements in Vehicle-Frames, of which the following is a specification, reference being had to the accompanying drawings, forming a part hereof.

This invention has relation to the construction and arrangement of the frames of vehicles and the appurtenances of such frames, and has for its object to improve such frames and their appurtenances in general, and more especially to produce a frame which shall be specially adapted for a vehicle from which the load or bodies can be easily removed to be used as a delivery-wagon or for other business purposes or as a pleasure-vehicle and which is propelled by driving mechanism operated either by a driver who sits on the vehicle or by a motor carried by the vehicle or by a combination of both. In general the frame comprises a central girder, which gives the necessary stiffness in a vertical plane, and side frames or shelves upon which may be supported either boxes or bodies for goods or seats for passengers, while in the preferred form the weight of the driving mechanism and of the driver and motor, if one be employed, is supported at one end of the main part of the vehicle and substantially over the driving-axle. The frame is adapted in its main features for either a three-wheeled or a four-wheeled vehicle, being shown, however, as adapted to a three-wheeled vehicle.

The several features of improvement will be more particularly pointed out hereinafter with reference to the accompanying drawings, in which the invention is illustrated, and in which—

Figure 1:
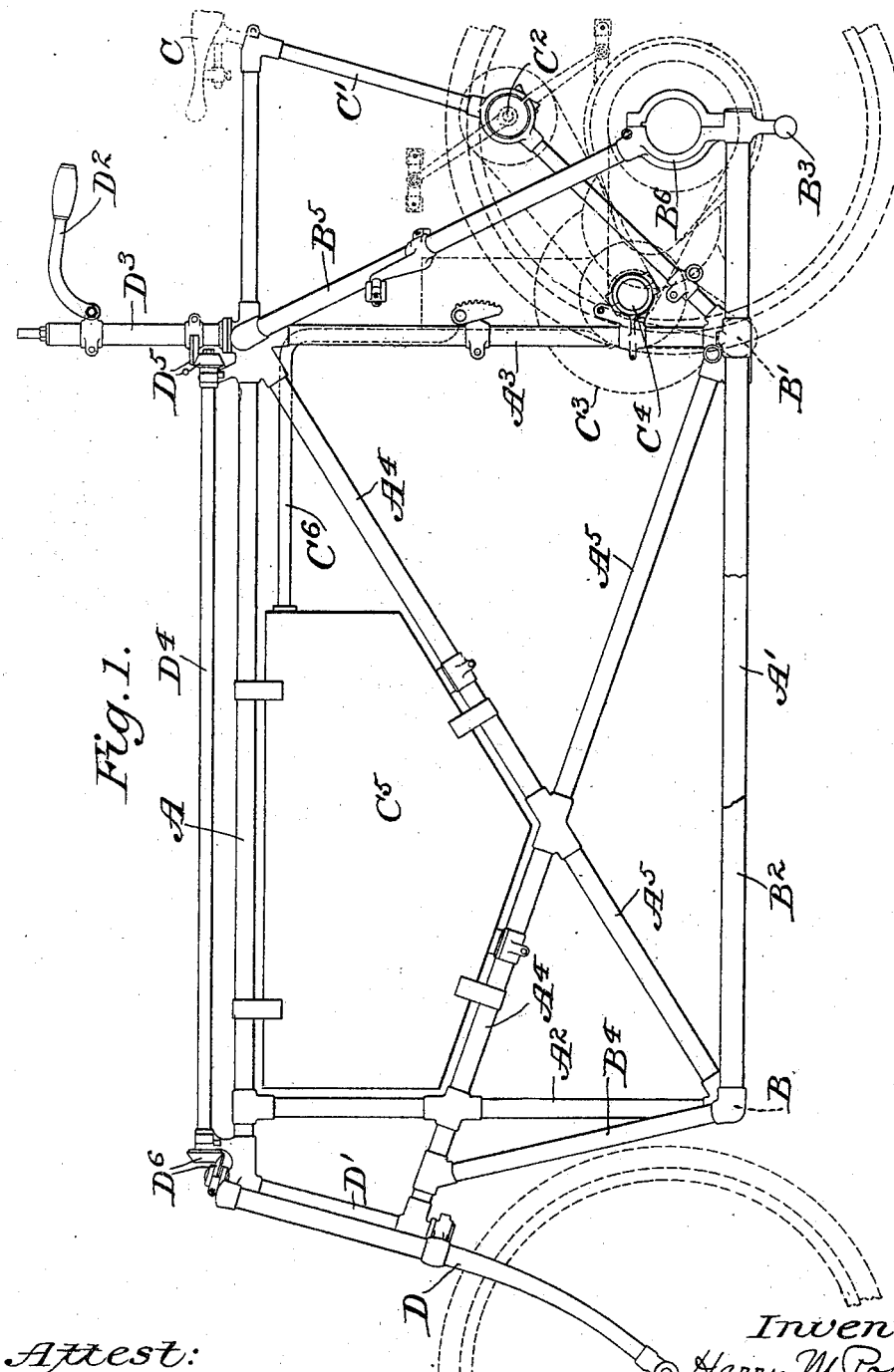
Figure 2:
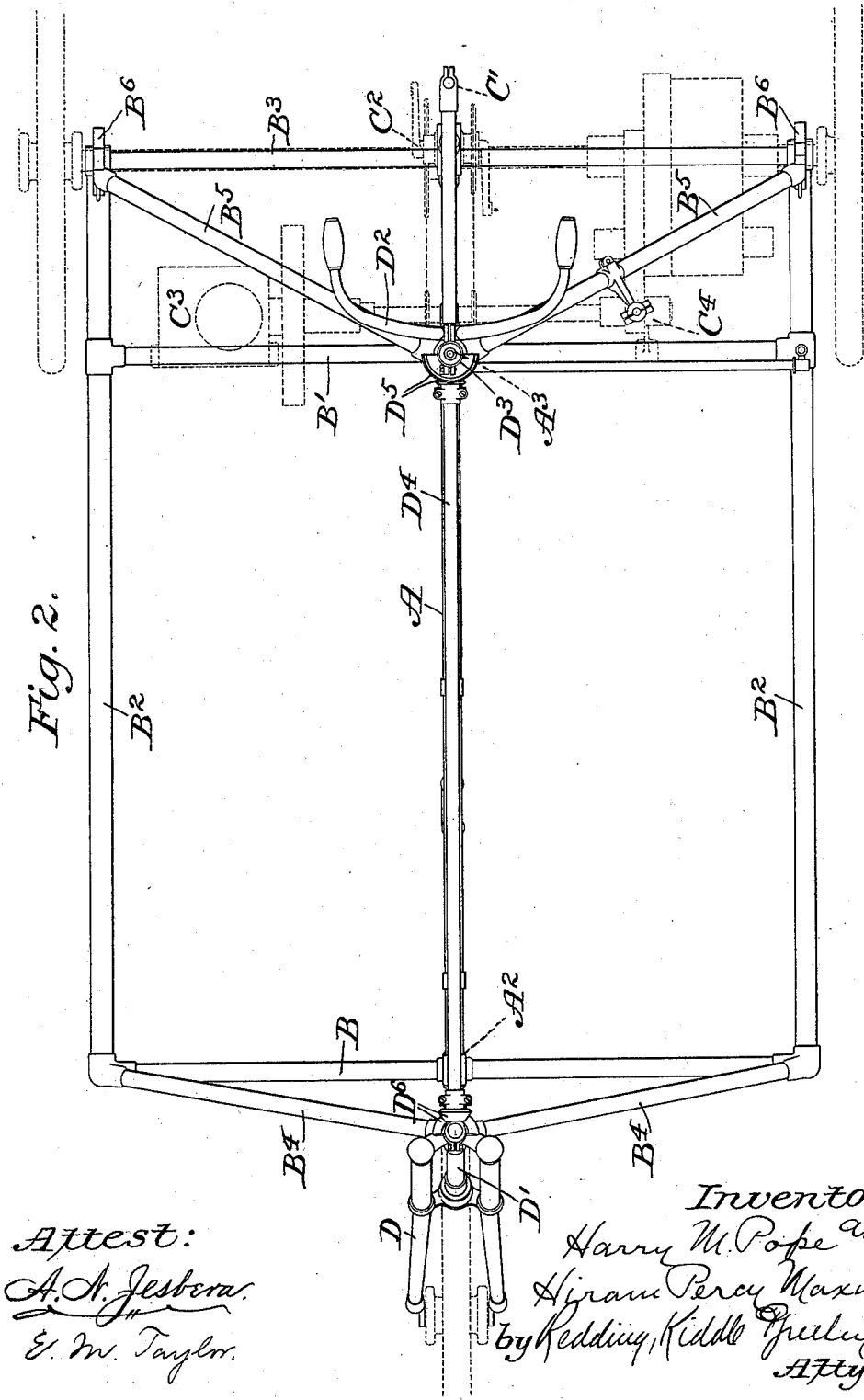
Figure 3:
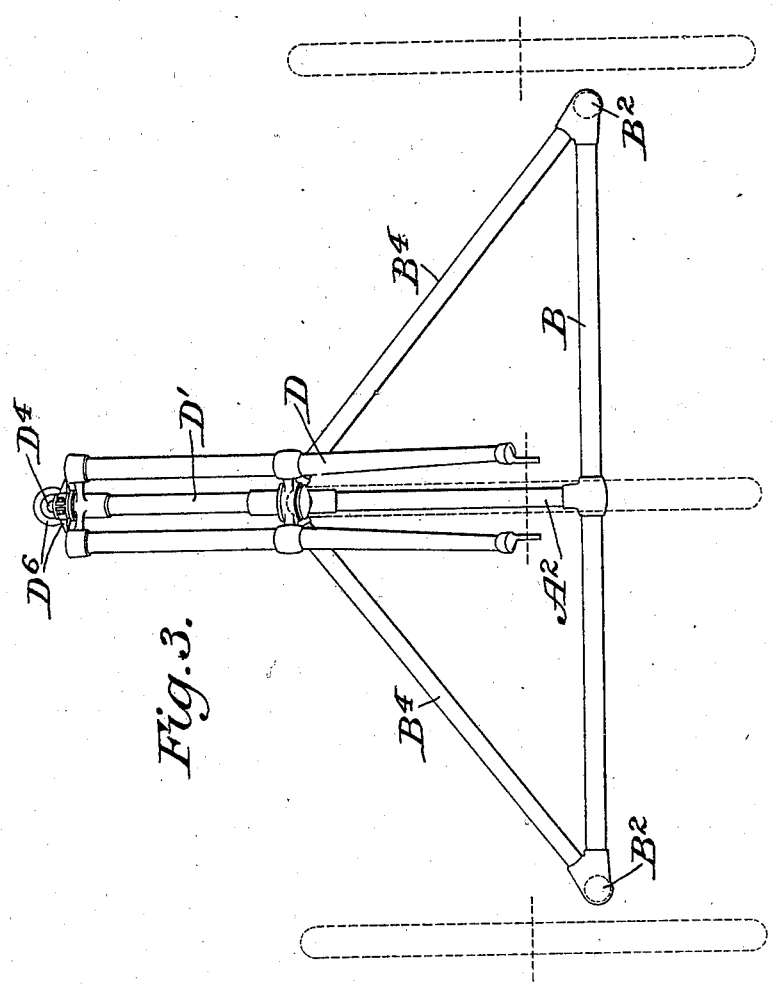
Figure 4:
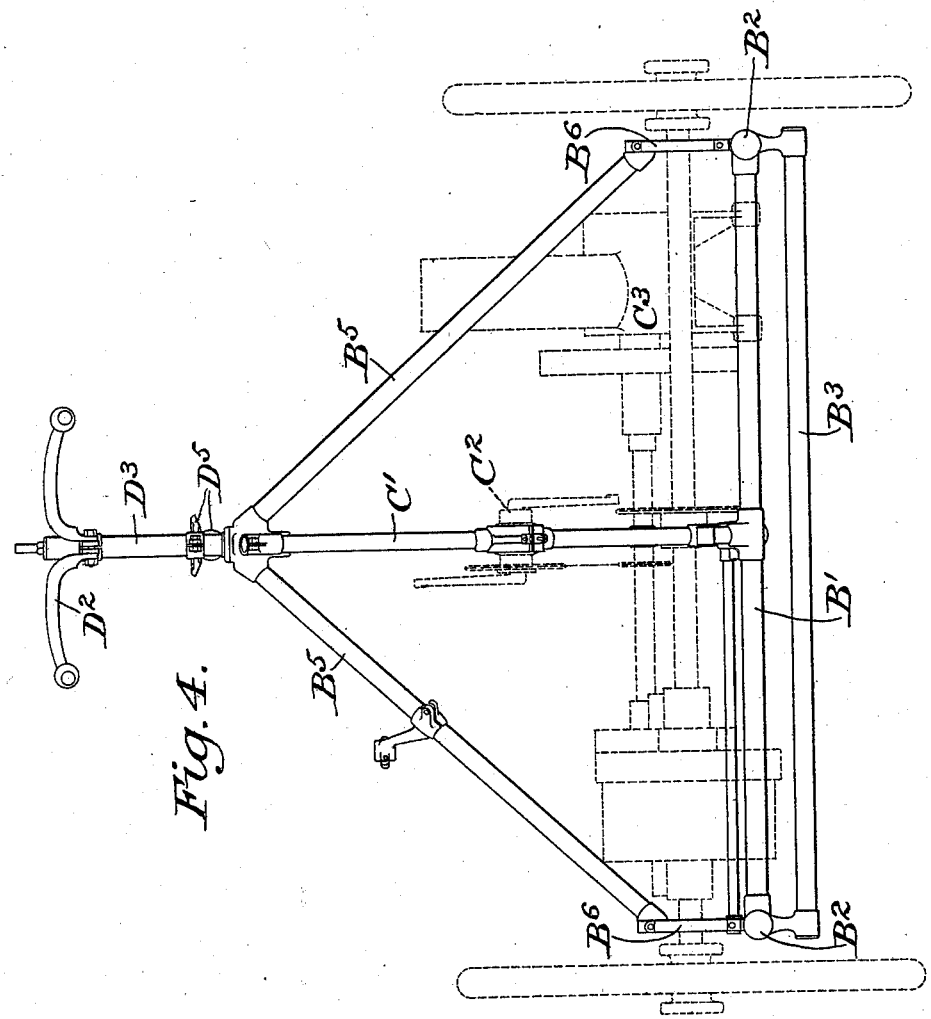

Figure 1 is a side elevation of a vehicle-frame which embodies the invention. Fig. 2 is a plan view of the same. Figs. 3 and 4 are respectively a front end elevation and a rear end elevation.

In the several figures of the drawings the motor, driving mechanism, and wheels, with the particular character of which the present invention is not concerned, are represented in dotted lines in order to avoid confusion in the drawings.

The frame as a whole receives its stiffness in a vertical plane from a central girder, which obviously may be, so far as the arrangement of its members is concerned, of any suitable form. As represented in the drawings, it comprises an upper chord A, a lower chord A', front and rear vertical members $A^2$ and $A^3$, and braces $A^4$ $A^5$. All of these parts, as well as other parts to be referred to hereinafter, are preferably formed of tubes, suitable union-pieces being provided to unite them, as common in the construction of frames from tubular members. Shelves are formed at each side of the central girder to receive goods, boxes, or bodies, or seats for passengers by horizontal frames, which are supported from the central girder. As represented, cross-bars B and B' are secured to the lower chord A' at the junction therewith of the front and rear vertical members $A^2$ and $A^3$, respectively, their outer ends, on each side of the central girder, being united by side bars $B^2$. The latter are extended to the rear of the cross-bar B', and their ends are preferably united by a third cross-bar $B^3$, which lies wholly beyond the end of the central girder. The horizontal frames are further supported from the upper part of the central girder by oblique members $B^4$ and $B^5$, which are extended downwardly and outwardly from the girder to the outer parts of the horizontal frames at each side. The front oblique members $B^4$ are shown as secured at their upper and inner ends to an extension of the brace $A^4$, forward of the front vertical member $A^2$ of the girder, while the rear oblique members $B^5$ are shown as extended from the top of the rear member of the girder downwardly, outwardly, and rearwardly to the ends of the side bars $B^2$, to which they are secured, as represented in the drawings, through bearing-brackets $B^6$ for the rear or driving shaft or axle, the said brackets being above the side bars, so that the floor of the vehicle-frame is near or below the plane of the wheel-axis, whereby the vehicle is easily mounted by passengers or its load of goods is easily placed thereon and stability is secured.

In a vehicle of this description it is desirable to have the fixed weight supported as near as practicable to the driving-axle. Accordingly the seat for the driver (indicated at C) is supported by an extension of the central girder beyond or outside of the rear vertical member $A^3$, such extension comprising, in the construction represented in the drawings, an extension of the upper chord A and a brace C' extending from the end of said extension to the lower end of the member $A^3$ of the central girder, which brace, being in the plane of the central girder and secured at its foot to the end member of said central girder and to the intermediate cross-bar B', does not interfere with or prevent free access to the driving mechanism, which is wholly supported beyond or outside of said vertical member $A^3$.

The steering-wheel of the three-wheeled arrangement shown in the drawings is supported, as is desirable, in an inclined steering-fork D, which is carried by an inclined steering-head D', which is supported by an extension of the brace $A^4$ and by a similar but shorter extension of the upper chord A. Both by reason of the construction of the frame and for the greater convenience of the driver the handle-bar $D^2$ is supported by a vertical steering-head $D^3$, and to provide for the proper transmission of motion from the vertical rear steering-head to the inclined steering-head an intermediate shaft $D^4$ is supported in bearings above the upper chord A and is connected at its ends with the steering-head or handle-bar stem and with the head of the fork by suitable bevel-gears, (indicated at $D^5$ and $D^6$, respectively.)

If the vehicle is to be propelled by the driver, a crank-shaft (indicated at $C^2$) may be supported in a suitable bearing carried by the brace C' and connected with the driving-axle by suitable intermediate driving mechanism, which is sufficiently indicated in the drawings by dotted lines and need not be further described herein. If a motor, as indicated at $C^3$, is employed, it is supported on the extension of the horizontal frame beyond or outside of the central girder and substantially near the bearings for the driving-axle, while the driving mechanism (sufficiently indicated by dotted lines in the drawings) intermediate said motor and axle, is also supported upon said extension of the horizontal frame and in bearings, as indicated at $C^4$, wholly beyond or outside of the central girder and in proximity to the rear axle. The result of this arrangement, as indicated above, is that the weight of the driver, motor, and driving mechanism—that is to say, substantially the whole of the fixed weight to be supported by the vehicle-frame—is supported at the end and outside of the main part of the frame and substantially over the driving-axle.

If the motor employed is of a type which requires a liquid fuel-supply, such fuel-supply may be carried in a thin flat tank $C^5$, which is supported fore and aft by and between the members of the central girder and connected with the motor through a suitable pipe $C^6$. Thus arranged the fuel-supply does not take up valuable space on the vehicle.

It will be understood that the details of construction herein may be varied from the construction and arrangement shown and described herein without departing from the spirit of the invention.

We claim as our invention—

1. A three-wheeled vehicle having a frame adapted to be supported upon two wheels at one end and a third wheel at the other end, said frame comprising a central girder extending from end to end of the frame with its members in a vertical plane, and a horizontal floor-supporting frame with its members in the same horizontal plane at each side thereof and rigidly supported therefrom near the bottom thereof at each end, whereby an unobstructed platform is provided at each side of the vehicle.

2. A vehicle-frame comprising a central, vertical girder extending from end to end of the frame with its members in the same plane, a horizontal frame extended from each side of said girder with its members in the same horizontal plane, and oblique members extended downwardly and outwardly from said girder to the outer parts of said frame at each end and rigidly connecting the same, whereby an unobstructed platform is provided at each side of the vehicle.

3. A vehicle-frame comprising a central, vertical girder extending from end to end of the frame with its members in the same plane, a horizontal frame rigidly connected to and extended outwardly from the lower chord of said girder on each side with its members in the same horizontal plane, and oblique members extended downwardly and outwardly from said girder to the outer parts of said frame at each end and rigidly connecting the same, whereby an unobstructed platform is provided at each side of the vehicle.

4. A vehicle-frame comprising a central, vertical girder extending from end to end of the frame with its members in the same plane, a horizontal frame rigidly connected to and extended from each side of said girder with its members in the same horizontal plane, oblique members extended downwardly and outwardly from said girder to the outer parts of said frame at each end and rigidly connecting the same, and bearing-brackets for a wheel-axle secured to one end of said horizontal frame, whereby an unobstructed platform is provided at each side of the vehicle.

5. A vehicle-frame comprising a central, vertical girder extending from end to end of the frame with its members in the same plane, a horizontal frame rigidly connected to and extended from each side of said girder with its members in the same horizontal plane, bearing-brackets for a wheel-axle secured to said horizontal frame, and oblique members extended downwardly and outwardly from said girder to said bearing-brackets and to each side of the horizontal frame at the other end and rigidly connecting the same, whereby an unobstructed platform is provided at each side of the vehicle.

6. The combination with a vehicle-frame comprising a central, vertical girder extending from end to end of the frame with its members in the same plane, and frames with their members in the same horizontal plane to carry the load on each side of said girder, of an extension from said frames, bearings for the driving-axle carried by said extension, and driving mechanism and bearings for the same supported beyond or outside of said girder, whereby an unobstructed platform is provided at each side of the vehicle and the fixed weight is supported over the driving-axle.

7. The combination with a vehicle-frame comprising a central, vertical girder extending from end to end of the frame with its members in the same plane, and frames with their members in the same horizontal plane to carry the load on each side of said girder, of an extension from said frames, bearings for the driving-axle carried by said extension, and an extension from said central girder to support the driver over the driving-axle, whereby an unobstructed platform is provided at each side of the vehicle and the fixed weight is supported over the driving-axle.

This specification signed and witnessed this 28th day of June, A. D. 1898.

HIRAM PERCY MAXIM.
HARRY M. POPE.

In presence of—
H. E. HART,
W. B. GREELEY.